No. 881,436. PATENTED MAR. 10, 1908.
C. H. McCRACKEN.
ANIMAL POKE.
APPLICATION FILED OCT. 4, 1907.

Witnesses
L. O. Little
M. S. Skinner

Inventor
Charles H. McCracken
By Watson E. Coleman
Attorney

UNITED STATES PATENT OFFICE.

CHARLES H. McCRACKEN, OF PERRY, OKLAHOMA.

ANIMAL-POKE.

No. 881,436.

Specification of Letters Patent.

Patented March 10, 1908.

Application filed October 4, 1907. Serial No. 395,896.

*To all whom it may concern:*

Be it known that I, CHARLES H. Mc-CRACKEN, a citizen of the United States, residing at Perry, in the county of Noble and State of Oklahoma, have invented certain new and useful Improvements in Animal-Pokes, of which the following is a specification, reference being had to the accompanying drawings.

My invention relates to improvements in animal pokes for restraining cattle or other stock within a fence or inclosure, especially a wire fence, and it consists of a flexible element adapted to be attached to the nose, neck or other portion of an animal and provided with upwardly and outwardly extending projections or fingers which will catch upon the fence when an animal attempts to get over or go through the same.

The object of the invention is to provide a device of this character which will be simple and inexpensive in construction, which may be quickly and easily applied or removed and which will be exceedingly effective in accomplishing its intended purpose.

Figure 1:
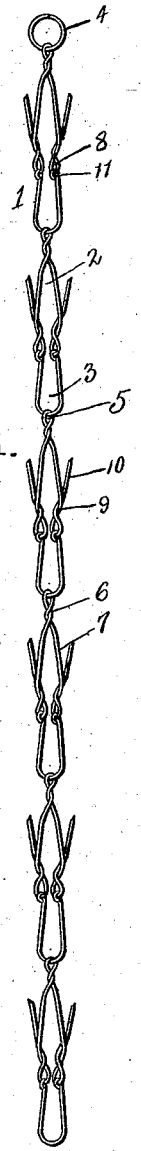
Figure 2:
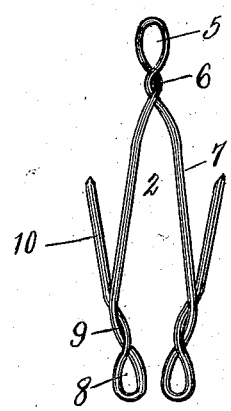
Figure 3:
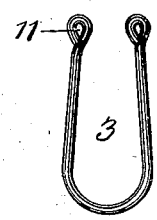

With the above and other objects in view the invention further consists in the novel features of construction and the combination and arrangement of parts hereinafter described and claimed, and illustrated in the accompanying drawings, in which Figure 1 is a perspective view of my improved animal poke; and Figs. 2 and 3 are enlarged detail views of the links of which the poke is composed.

My invention contemplates a flexible element such as a chain provided with projections which will catch upon a fence or the like, and also provided with a suitable means for attaching the element to the nose of the animal or to a collar or halter so that it will hang downwardly in such manner as to readily catch upon the fence when the animal attempts to go over or through it.

The preferred embodiment of the invention illustrated in the drawings is in the form of a metal chain 1 composed of two different kinds of links 2, 3 and having at its upper end a ring 4 which may be inserted in the nose of an animal or attached to its collar or halter. Any other suitable attaching means may be substituted for the ring 4. The links or members 2 are each preferably formed from a single piece of wire which is bent at its center to form a loop or eye 5. The two branches of the wire are then twisted together as at 6 to close said loop and from this twisted portion they diverge to provide straight arms 7. At the lower ends of the arms 7 the branches or ends of the wire are again bent upon themselves to provide loops or eyes 8 and they are further bent to provide twisted portions 9 and outwardly and upwardly projecting fingers or points 10. These fingers or projections 10 extend outwardly and upwardly from the opposite sides of the link 2 so as to effectively engage the wires or other portions of a fence. The links 3 are used to unite the links 2 and each one is preferably formed from a single piece of wire which is bent into U-form and has the ends of its parallel arms bent to form eyes 11 which engage the eyes 8 of the links 2. The closed ends of the links 3 are engaged with the eyes 5 of the links 2 and said eye of the foremost link 2 is engaged by the ring 4 or other attaching device. It will be understood that the links of the chain may be made of any length and that any number of them may be employed so that the device will hang a suitable distance from the collar, halter or nose ring to which it is attached.

While I have shown and described the preferred embodiment of the invention I wish it understood that I do not limit myself to the precise construction set forth and that various changes in the form, proportion and minor details may be resorted to within the scope of the invention.

Having thus described my invention what I claim is:

1. An animal poke, comprising a chain having links formed from pieces of wire bent at their centers to form eyes and arms, said arms being bent intermediate their ends to provide eyes and upwardly and outwardly projecting fingers and connections between the eyes of the links, substantially as set forth.

2. An animal poke, comprising a chain having links formed from pieces of wire bent at their centers to form eyes and arms, said arms being bent intermediate their ends to provide eyes and upwardly and outwardly projecting fingers and connecting links each engaged with the eye at one end of the first mentioned links, said connecting links having arms provided with eyes to engage the eyes at the ends of the arms of the first mentioned links, substantially as described.

3. An animal poke, comprising a chain having links each provided with diverging arms and having an eye at its united upper end and eyes at its diverging lower ends, the arms of said links being also provided with outwardly and upwardly projecting fingers, and connecting links of substantially U-form, each of the latter being engaged with the eye at the upper end of the first mentioned links and having eyes at the ends of its branches engaged with the eyes at the lower end of one of the first mentioned links.

4. An animal poke comprising a chain composed of links having fingers, other links uniting the first mentioned ones and means for attaching the chain to the head or neck of an animal.

5. An animal poke comprising a chain having links provided with diverging arms having an eye at their united upper ends and eyes at their diverging lower ends, the arms of said links being also provided with outwardly and upwardly inclined fingers, connecting links of U-form, each of the latter being engaged with the eye at the upper end of one of the first-mentioned links, and having eyes at the ends of its branches engaged with the eyes at the lower ends of one of the first mentioned links, and means for attaching the chain to the head or neck of an animal.

In testimony whereof I hereunto affix my signature in the presence of two witnesses.

CHARLES H. McCRACKEN.

Witnesses:
P. W. CRESS,
W. M. HOBBS.